United States Patent
Schleif et al.

(10) Patent No.: US 10,180,079 B2
(45) Date of Patent: Jan. 15, 2019

(54) COMMUNICATING SIGNAL BETWEEN ROTATING ANTENNA AND PLURALITY OF STATIONARY ANTENNAE BASED ON DISPLACEMENT

(71) Applicant: General Electric Company, Schenectady, NY (US)

(72) Inventors: Kurt Kramer Schleif, Greenville, SC (US); Donald W. Shaw, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/407,521

(22) Filed: Jan. 17, 2017

(65) Prior Publication Data

US 2018/0202312 A1  Jul. 19, 2018

(51) Int. Cl.
| | | |
|---|---|---|
| G08C 19/00 | (2006.01) |
| F01D 21/00 | (2006.01) |
| H01Q 1/27 | (2006.01) |
| H04Q 9/00 | (2006.01) |
| G01M 15/14 | (2006.01) |

(Continued)

(52) U.S. Cl.
CPC .............. *F01D 21/003* (2013.01); *F02C 3/00* (2013.01); *F02C 3/04* (2013.01); *F02C 7/00* (2013.01); *F02C 9/28* (2013.01); *G01M 15/14* (2013.01); *H01Q 1/27* (2013.01); *H04Q 9/00* (2013.01); *F05D 2220/32* (2013.01);

(Continued)

(58) Field of Classification Search
CPC ...................................................... F01D 5/12
See application file for complete search history.

(56) References Cited

U.S. PATENT DOCUMENTS 4,036,270 A * 7/1977 Bright ...................... B23Q 7/03
                                                        144/208.8
6,081,230 A * 6/2000 Hoshino .............. G01C 21/165
                                                         342/357.32

(Continued)

FOREIGN PATENT DOCUMENTS

| EP | 1482658 A2 | 12/2004 |
|---|---|---|
| WO | 2008091289 A2 | 7/2008 |

OTHER PUBLICATIONS

French Search Report and Written Opinion dated Sep. 18, 2017 which was issued in connection with French patent application No. FR 1750329 which was filed on Jan. 17, 2018.

*Primary Examiner* — Amine Benlagsir
(74) *Attorney, Agent, or Firm* — GE Global Patent Operation; Robert D. Crawford, II

(57) ABSTRACT

Methods and systems for communicating a signal between a rotating antenna and a plurality of stationary antennae based on an axial displacement of the rotating antenna are provided. In one example, the method can include obtaining one or more measurements of an axial displacement of the rotating antenna from one or more axial displacement sensors. The method can further include determining a selected stationary antenna from the plurality of stationary antennae based at least in part on the measurements of an axial displacement of the rotating antenna. The method can further include activating the selected stationary antenna to communicate a signal with the rotating antenna. The method can further include communicating a signal between the rotating antenna and the selected stationary antenna.

20 Claims, 4 Drawing Sheets

(51) Int. Cl.
*F02C 3/04* (2006.01)
*F02C 3/00* (2006.01)
*F02C 7/00* (2006.01)
*F02C 9/28* (2006.01)

(52) U.S. Cl.
CPC ...... *F05D 2240/60* (2013.01); *F05D 2270/80* (2013.01); *F05D 2270/808* (2013.01); *H04Q 2209/40* (2013.01)

(56) References Cited

U.S. PATENT DOCUMENTS

| | | | | |
|---|---|---|---|---|
| 6,501,372 | B2* | 12/2002 | Lin | B60C 23/0408 340/442 |
| 7,751,785 | B2 | 7/2010 | Carvalho et al. | |
| 9,653,770 | B2* | 5/2017 | Henry | H04B 7/15557 |
| 2006/0056959 | A1* | 3/2006 | Sabol | F01D 17/02 415/118 |
| 2006/0212193 | A1* | 9/2006 | Breed | B60C 23/0425 701/33.7 |
| 2006/0212194 | A1* | 9/2006 | Breed | G07C 5/008 701/1 |
| 2007/0075919 | A1* | 4/2007 | Breed | B60R 21/013 345/8 |
| 2007/0096565 | A1* | 5/2007 | Breed | B60C 23/0408 307/116 |
| 2008/0224845 | A1* | 9/2008 | Bires | G01K 1/024 340/501 |
| 2010/0117859 | A1* | 5/2010 | Mitchell | F01D 17/02 340/870.16 |
| 2012/0096946 | A1* | 4/2012 | Schleif | F01D 17/08 73/756 |
| 2015/0330310 | A1* | 11/2015 | deGaribody | G01S 17/58 701/100 |
| 2016/0319695 | A1* | 11/2016 | Isom | F01D 11/20 |

* cited by examiner

COMMUNICATING SIGNAL BETWEEN ROTATING ANTENNA AND PLURALITY OF STATIONARY ANTENNAE BASED ON DISPLACEMENT

FIELD OF THE INVENTION

The present subject matter relates generally to communicating a signal between a rotating antenna and a plurality of stationary antennae in, for instance, a gas turbine system.

BACKGROUND OF THE INVENTION

A gas turbine, such as an industrial, aircraft or marine gas turbine generally includes, in serial flow order, a compressor, a combustor and a turbine. The turbine has multiple stages with each stage including a row of turbine nozzles and an adjacent row of turbine rotor blades disposed downstream from the turbine nozzles. The turbine nozzles are held stationary within the turbine and the rotor blades rotate with a rotating shaft. The various turbine stages define a hot gas path through the turbine.

During operation, the compressor provides compressed air to the combustor. The compressed air is mixed with fuel and burned in a combustion chamber or reaction zone defined within the combustor to produce a high velocity stream of hot gas. The hot gas flows from the combustor into the hot gas path of the turbine via a turbine inlet. As the hot gas flows through each successive stage, kinetic energy from the high velocity hot gas is transferred to the rows of turbine rotating blades, thus causing the rotating shaft to rotate and produce mechanical work.

It may be desirable to obtain information regarding various components of the gas turbine during operation, such as operating temperatures, which can be measured by thermocouples, or strain, which can be measured by strain gauges. The measurements obtained by these sensors can be wirelessly transmitted from an antenna located on the rotating shaft of the gas turbine to a stationary antenna located in close proximity to the rotating antenna. However, thermal expansion of the rotating shaft can cause the rotating antenna to be moved away from the stationary antenna, leading to reduced signal strength from the rotating antenna and possibly loss of a communication link between the stationary antenna and the rotating antenna.

BRIEF DESCRIPTION OF THE INVENTION

Aspects and advantages of the invention will be set forth in part in the following description, or may be obvious from the description, or may be learned through practice of the invention.

One example aspect of the present disclosure is directed to a method for communicating a signal between a rotating antenna located on a shaft and a plurality of stationary antennae. The shaft defines an axial direction. The plurality of stationary antennae is spaced along the axial direction. The method includes obtaining, by one or more control devices, one or more measurements of an axial displacement of the rotating antenna from one or more axial displacement sensors. The method can further include determining, by the one or more computing devices, a selected stationary antenna from the plurality of stationary antennae based at least in part on the one or more measurements of an axial displacement of the rotating antenna. The method can further include activating, by the one or more control devices, the selected stationary antenna to communicate with the rotating antenna. The method can further include communicating a signal between the rotating antenna and the selected stationary antenna.

Another example aspect of the present disclosure is directed to a system. The system can include a rotating antenna located on a rotating shaft. The rotating shaft defines an axial direction. The system can further include a plurality of stationary antennae spaced in the axial direction relative to the rotating antenna. The system can further include a control system configured to perform operations. The operations can include obtaining data indicative of an axial displacement of the rotating antenna from one or more axial displacement sensors; determining a selected stationary antenna from the plurality of stationary antennae based at least in part on the data indicative of an axial displacement of the rotating antenna; activating the selected stationary antenna to communicate with the rotating antenna; and communicating a signal between the rotating antenna and the selected stationary antenna.

Another example aspect of the present disclosure is directed to a gas turbine. The gas turbine can include a compressor section, a combustion section, and a turbine section in series flow. The gas turbine can further include a rotating shaft. The rotating shaft defines an axial direction. The gas turbine can further include one or more axial displacement sensors. The gas turbine can further include a rotating antenna located on the rotating shaft of the gas turbine. The gas turbine can further include a plurality of stationary antennae spaced in the axial direction relative to the rotating antenna. The gas turbine can further include a control system configured to perform operations. The operations can include obtaining data indicative of an axial displacement of the rotating antenna from one or more axial displacement sensors; determining a selected stationary antenna from the plurality of stationary antennae based at least in part on the data indicative of an axial displacement of the rotating antenna; activating the selected stationary antenna to communicate with the rotating antenna; and communicating a signal between the rotating antenna and the selected stationary antenna.

Other example aspects of the present disclosure are directed to gas turbine engines, devices, apparatus, and other systems configured to communicate a signal between a rotating antenna and a plurality of stationary antennae. Variations and modifications can be made to these example aspects of the present disclosure.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
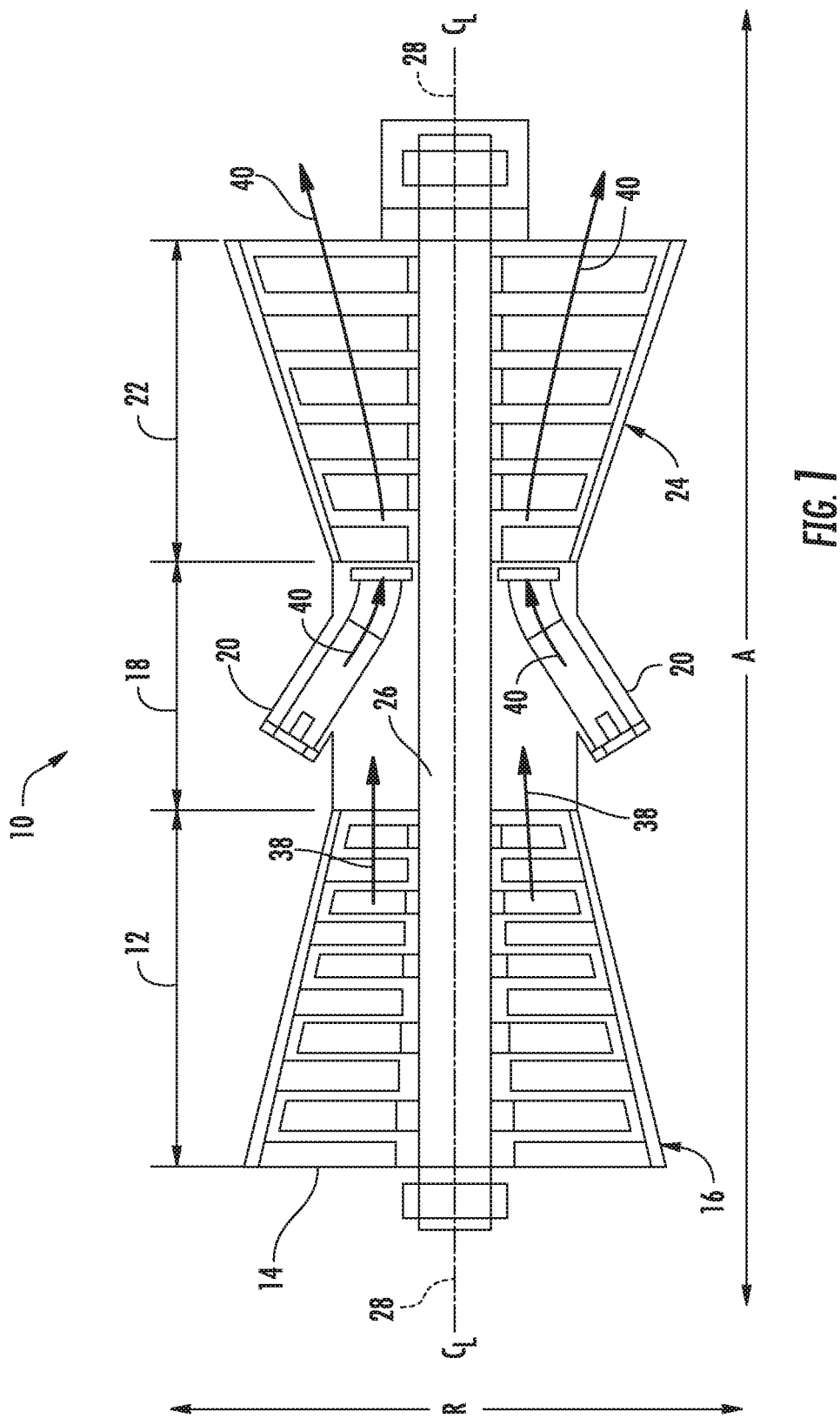
FIG. 1 is a schematic, cross-sectional view of a gas turbine according to example embodiments of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Example aspects of the present disclosure are directed to communicating a signal between a rotating antenna and a plurality of stationary antenna. Wireless communication systems can be used to transfer data in industrial applications, such as operational data regarding a gas turbine. For example, an antenna can be located on a rotating shaft in a gas turbine to send data across an air gap to a plurality of stationary antennae. The rotating antenna can send data regarding the operational status of various components of the gas turbine, such as temperature measured by a thermocouple or strain measured by a strain gauge.

Due to limitations on the signal strength from the rotating antenna, the rotating antenna may only be able to communicate with a single stationary antenna in the plurality of stationary antennae. For example, the signal strength may be limited due to regulatory requirements, such as frequency and power level restrictions promulgated by the Federal Communications Commission. Additionally, the signal strength of the rotating antenna may be limited by power limitations of the wireless system. For applications in which the rotating antenna is subject to an axial displacement (e.g., an antenna mounted on a thermally expanding rotating shaft of a gas turbine), the signal strength from the rotating antenna may not be sufficiently strong to maintain an uninterrupted communication link with a single stationary antenna. In general, as the distance between two antennae increases, the signal strength from an antenna sending a signal to a receiving antenna decreases. In order to maintain a communication link between the rotating antenna and the plurality of stationary antennae so that data is not lost, it may be desirable to switch between stationary antennae in the plurality of stationary antennae to communicate a signal with the rotating antenna.

However, manually switching between stationary antennae in a plurality of stationary antennae can be problematic for several reasons. First, an operator may be required to switch between stationary antennae, which can be cost prohibitive. Second, manually switching between stationary antennae can result in the loss of data when the communication link between the rotating antenna and a first stationary antenna is lost before a communication link between the rotating antenna and a second stationary antenna is established. Third, the operator may not know which stationary antenna to switch to in order to establish a communication link, and may have to switch between stationary antennae multiple times before a communication link is established.

The method, system, and devices according to example aspects of the present disclosure can maintain a communication link between a rotating antenna and a plurality of stationary antennae by selecting a stationary antenna from a plurality of stationary antennae (e.g., an array of stationary antennae) in sufficiently close proximity to the rotating antenna and communicating a signal with the selected stationary antenna. In some embodiments, an axial displacement sensor can measure an axial displacement of a rotating antenna in real time. An axial displacement measurement can be used to select a stationary antenna from an array of stationary antennae that is in sufficiently close proximity to the rotating antenna for a communication link to be established. The selected stationary antenna can then be activated to communicate a signal with the rotating antenna. The rotating antenna can then communicate a signal with the selected stationary antenna. Communicating a signal between the rotating antenna and a selected stationary antenna in this manner can aid in establishing an uninterrupted communication link between the rotating antenna and the array of stationary antennae.

According to particular aspects of the present disclosure, a rotating antenna can be configured to communicate a signal with an array of stationary antennae. For example, the rotating antenna can be mounted at a known position on a rotating shaft, such as a rotating shaft in a gas turbine, and configured to communicate a signal across an air gap to an array of two or more stationary antennae. The rotating antenna can be mounted at a fixed position on a rotating shaft of a gas turbine, and move in an axial direction due to thermal expansion of the rotating shaft. In some embodiments, an array of stationary antennae can be aligned in the axial direction across an air gap such that the array of stationary antennae runs parallel to the axial direction. For example, in one embodiment, a plurality of stationary antennae can be mounted at known distances from each other across in an axially-aligned array across an air gap from an antenna mounted at a fixed location on the rotating shaft of a gas turbine. Each stationary antenna can be configured to communicate a signal to/from the rotating antenna. An axial displacement sensor can be configured to measure an axial displacement of the rotating antenna in order to determine a stationary antenna in sufficiently close proximity to communicate a signal with the rotating antenna.

For example, a displacement laser sensor or capacitive probe can be positioned a known distance from the array of stationary antennae and configured to determine an axial displacement of the rotating antenna. The measurements from the axial displacement sensor can be used to determine a stationary antenna from the array of stationary antennae in sufficiently close proximity to the rotating antenna. For example, a rotating antenna mounted on a rotating shaft of a gas turbine can be displaced axially due to thermal expansion of the rotating shaft. As the rotating antenna is displaced axially, the axial displacement sensor can measure the distance between the axial displacement sensor and the rotating antennae.

In some embodiments, a controller can then be used to determine which stationary antenna from the array of stationary antennae is in sufficiently close proximity to the rotating antenna to communicate a signal using the known spacing of the stationary antenna and the measurements obtained by the axial displacement sensor. Once a stationary antenna has been selected from the array based on the axial displacement of the rotating antenna, the selected antenna can be activated to communicate a signal with the rotating antenna. For example, the controller can send a control signal to an automatic switch to activate the selected stationary antenna. The selected stationary antenna can then communicate with the rotating antenna. By periodically determining the axial displacement of the rotating antenna and selecting a stationary antenna from an array of stationary antennae based on the axial displacement of the rotating antenna, an uninterrupted communication link can be established between a rotating antenna and an array of stationary antennae.

In this way, the systems and methods according to example aspects of the present disclosure can have the technical effect of establishing and maintaining a communication link between a rotating antenna and an array of stationary antenna in an automated manner. This can result in a cost savings by eliminating the need for an operator to manually switch between stationary antennae in the array. Additionally, by switching between stationary antennae in an array based on displacement of the rotating antenna, an uninterrupted communication link can be established, thereby preventing or reducing the likelihood that any data will be lost.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Referring now to the drawings, FIG. 1 illustrates a schematic of an example gas turbine 10 as may incorporate various embodiments of the present invention. The present disclosure is discussed with reference to a gas turbine engine for purposes of illustration and discussion. Those having skill in the art, using the disclosure provided herein, will understand that aspects of the present disclosure can be used with other rotary machines, such as steam turbines for power generation, electric motors, or any other rotating device. As shown, the gas turbine 10 generally includes a compressor section 12 having an inlet 14 disposed at an upstream end of an axial compressor 16. The gas turbine 10 further includes a combustion section 18 having one or more combustors 20 positioned downstream from the compressor 16 and a turbine section 22 including a turbine 24 such as an expansion turbine that is disposed downstream from the combustion section 18. A rotating shaft 26 extends axially through the compressor 16 and the turbine 24 along an axial centerline 28 of the gas turbine 10.

As further shown in FIG. 1, the gas turbine engine 10 defines an axial direction A (extending parallel to a longitudinal centerline 28 provided for reference) and a radial direction R (normal to axial direction A).

In operation, as shown in FIG. 1, compressed air 38 from the compressor 16 is provided to the combustors 20 where it is mixed with fuel and burned to provide a stream of hot combustion gases 40 that flows from the combustors 20 into the turbine 24. As hot combustion gases 40 flow through turbine section 22, a portion of thermal and/or kinetic energy is extracted from the combustion gases 40 via turbine section 22, causing rotating shaft 26 to rotate.

Figure 2:
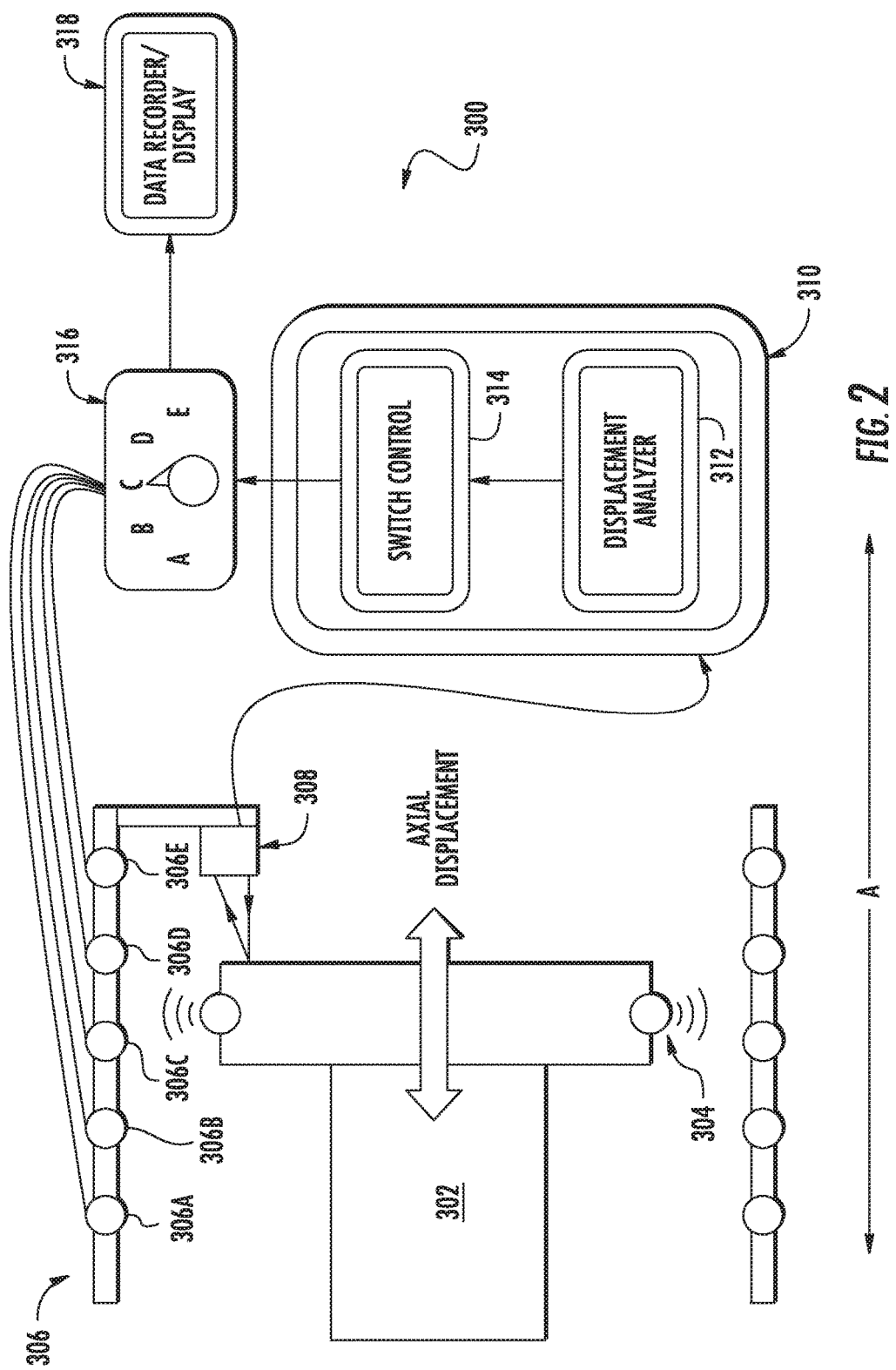
FIG. 2 is schematic of a communication system according to example embodiments of the present disclosure.

FIG. 2 is a schematic of a communication system 300 according to example embodiments of the present disclosure. As shown, a rotating shaft 302 defines an axial direction A. In one embodiment, rotating shaft 302 can be a rotating shaft 26 of a gas turbine 10, as depicted in FIG. 1. As depicted in FIG. 2, a rotating antenna 304 is mounted on rotating shaft 302 at a fixed location. Rotating antenna 304 rotates as rotating shaft 302 rotates. According to example aspects of the present disclosure, rotating antenna 304 can be displaced along axial direction A. For example, rotating antenna 304 can be displaced along axial direction A due to thermal expansion of rotating shaft 302.

Rotating antenna 304 can be configured to communicate a signal across an air gap to an array of stationary antennae 306, using, for instance, radio frequency or other wireless communication techniques. As depicted in FIG. 2, an array of stationary antennae 306 is configured along axial direction A parallel to rotating shaft 302, and includes a first stationary antenna 306A, a second stationary antenna 306B, a third stationary antenna 306C, a fourth stationary antenna 306D and a fifth stationary antenna 306E. Other suitable numbers of stationary antennae can be used without deviating from the scope of the present disclosure. For example, in another embodiment, the array of stationary antennae can comprise two or more stationary antenna. In one embodiment, each stationary antenna in the array of stationary antennae 306 is configured in a known spacing from each other stationary antenna 306. For example, in one embodiment, each stationary antenna can be spaced between 1 mm and 10 mm from another stationary antenna.

As depicted in FIG. 2, as rotating shaft 302 is displaced along axial direction A, rotating antenna 304 can either come into closer or further proximity to an individual stationary antenna in the array of stationary antennae 306. For example, as depicted in FIG. 2, as rotating shaft 302 moves along axial direction A such that rotating antenna 304 comes into closer proximity to stationary antenna 306E, rotating antenna 304 will move further away from stationary antenna 306A.

Figure 3:
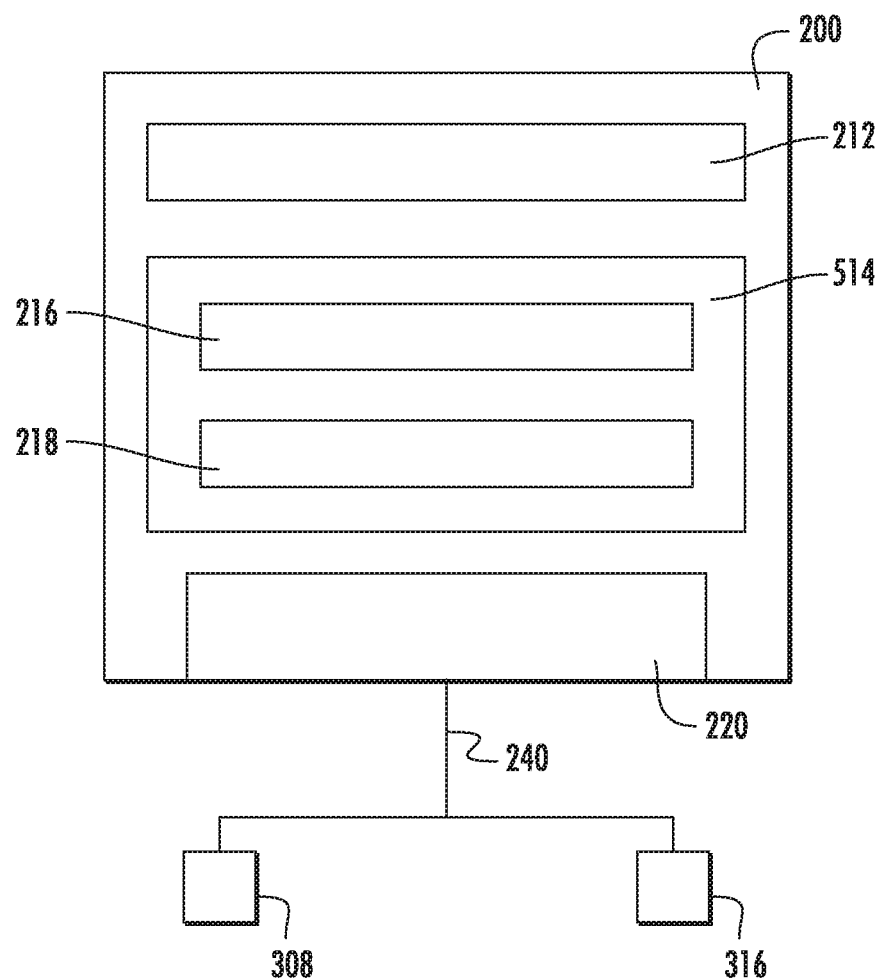
FIG. 3 depicts an example control device used in a control system according to example embodiments of the present disclosure.

As shown in FIG. 2, the communication system 300 can include a control system having an axial displacement sensor 308, one or more controllers 310, and a switch 316. The axial displacement sensor 308 can be configured to obtain data indicative of an axial displacement of rotating antenna 304. In one embodiment, axial displacement sensor 308 can be a non-contact sensor, such as a displacement laser sensor or a capacitive probe. For example, axial displacement sensor 308 can be a displacement laser sensor configured to bounce a laser beam off rotating shaft 302 and measure the axial displacement of rotating antenna 304 based on the time it takes the laser beam to return to the axial displacement sensor 308. Other suitable axial displacement sensors can be used without deviating from the scope of the present disclosure. In one embodiment, axial displacement sensor 308 can be mounted at a fixed location relative to the array of stationary antennae 306. For example, in one embodiment, axial displacement sensor 308 can be mounted along axial direction A at a fixed location relative to the array of stationary antennae 306 to measure an axial displacement of rotating shaft 302. The one or more controllers 310 can be configured to determine an axial displacement of rotating antenna 304. In one embodiment, controller(s) 310 can include one or more control devices 200 as illustrated in FIG. 3. Other suitable controllers can be used without deviating from the scope of the present disclosure.

As depicted in FIG. 2, controller(s) 310 can include a displacement analyzer 312 and a switch control 314. In some embodiments, the displacement analyzer 312 and switch control 314 can include computer logic used to perform functionality described herein. The displacement analyzer 312 and switch control 314 can be implemented in hardware, application specific circuits, firmware and/or software controlling a general purpose processor. In one embodiment, the displacement analyzer 312 and switch control 314 can include program code files stored on one or more memory devices and executed by one or more processors or can be provided from computer program products, for example computer executable instructions, that are stored in a tangible computer-readable storage medium such as RAM, ROM, hard disk or optical or magnetic media. When software is used, any suitable programming language or platform can be used to implement the displacement analyzer 312 and switch control 314.

The displacement analyzer 312 can be configured to analyze data indicative of an axial displacement obtained by axial displacement sensor 308. Using the data indicative of an axial displacement, displacement analyzer 312 can select a stationary antenna from the array of stationary antennae 306 to communicate with rotating antenna 304. For example, in one embodiment, displacement analyzer 312 can use the known location of axial displacement sensor 308 with respect to each individual stationary antenna in the array of stationary antennae 306 and data indicative of an axial displacement obtained by axial displacement sensor 308 to determine which stationary antenna is in closest proximity to rotating antenna 304. In another embodiment, displacement analyzer 312 can use the known location of axial displacement sensor 308 with respect to each individual stationary antenna in the array of stationary antennae 306 and data indicative of an axial displacement obtained by axial displacement sensor 308 to select a stationary antenna from the array of stationary antennae 306 that is in sufficiently close proximity to rotating antenna 304 for a communication link to be established.

Referring still to FIG. 2, displacement analyzer 312 can be configured to send a signal indicative of the selected stationary antenna to switch control 314. Switch control 314 can then send a signal to switch 316 to switch to the selected stationary antenna. Switch 316 can be configured to activate the selected stationary antenna from the array of stationary antennae 306 based on the signal from switch control 314 such that the selected stationary antenna can communicate a signal with the rotating antenna 304. For example, switch 316 can activate the selected stationary antenna by switching from a first antenna in the array to a second antenna in the array.

Data recorder/display device 318 can then record or display the signal communicated between the rotating antenna 304 and the selected stationary antenna. The data recorder/display device 318 can include one or more computing devices. For example, operational data obtained from sensors located on a gas turbine 10 can sent by a rotating antenna across an air gap to a selected stationary antenna, and the data can then be recorded or displayed.

Referring still to FIG. 2, as depicted, rotating antenna 304 is in closest proximity to stationary antenna 306C in the array of stationary antennae 306. According to example aspects of the present disclosure, axial displacement sensor 308 can obtain data indicative of an axial displacement of rotating antenna 304, and displacement analyzer 312 can determine a selected stationary antenna based on the data indicative of an axial displacement obtained by axial displacement sensor 308. As depicted in FIG. 2, displacement analyzer 312 can then select stationary antenna 306C as the selected stationary antenna. Switch control 314 can then communicate a signal to switch 316 to activate stationary antenna 306C. Rotating antenna 304 can then communicate a signal with selected stationary antenna 306C, where it can be recorded or displayed by data recorder/display device 318.

FIG. 3 depicts an example control device that can be used as a controller 310 of FIG. 2 according to example embodiments of the present disclosure. The control device(s) 200 can include one or more processors 212 and one or more memory devices 214. The one or more processors 212 can include any suitable processing device, such as a microprocessor, microcontroller, integrated circuit, logic device, or other suitable processing device. The one or more memory devices 214 can include one or more computer-readable media, including, but not limited to, non-transitory computer-readable media, RAM, ROM, hard drives, flash drives, or other memory devices.

The one or more memory devices 214 can store information accessible by the one or more processors 212, including computer-readable instructions 216 that can be executed by the one or more processors 212. The instructions 216 can be any set of instructions that when executed by the one or more processors 212, cause the one or more processors 212 to perform operations. The instructions 216 can be implemented in software written in any suitable programming language or can be implemented in hardware. In some embodiments, the instructions 216 can be executed by the one or more processors 212 to cause the one or more processors to perform operations, such as the operations for communicating a signal between a rotating antenna and an array of stationary antennae as described with reference to FIG. 4.

Referring to FIG. 3, the memory devices 214 can further store data 218 that can be accessed by the processors 212. The data 218 can include, for instance, measurements for the spacing of axially-aligned stationary antennae. The data 218 can also include data associated with models and algorithms used to perform the example methods according to example aspects of the present disclosure, such as models and algorithms for determining an axial displacement of a rotating antenna.

The control device(s) 200 can further include a communications interface 220. The communications interface 220 can be configured to communicate with sensors and switches over a communication network 240. For instance, the communications interface 220 can receive data obtained by an axial displacement sensor 308. In one embodiment, the communications interface 220 can provide control commands to a switch 316 to active a selected stationary antenna from an array of stationary antennae. The communications interface 220 can include any suitable components for interfacing with one more other devices, including for example, transmitters, receivers, ports, controllers, antennas, or other suitable components.

The technology discussed herein makes computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, processes discussed herein may be implemented using a single computing device or multiple computing devices working in combination. Databases, memory, instructions, and applications may be implemented on a single system or distributed across multiple systems. Distributed components may operate sequentially or in parallel.

Figure 4:
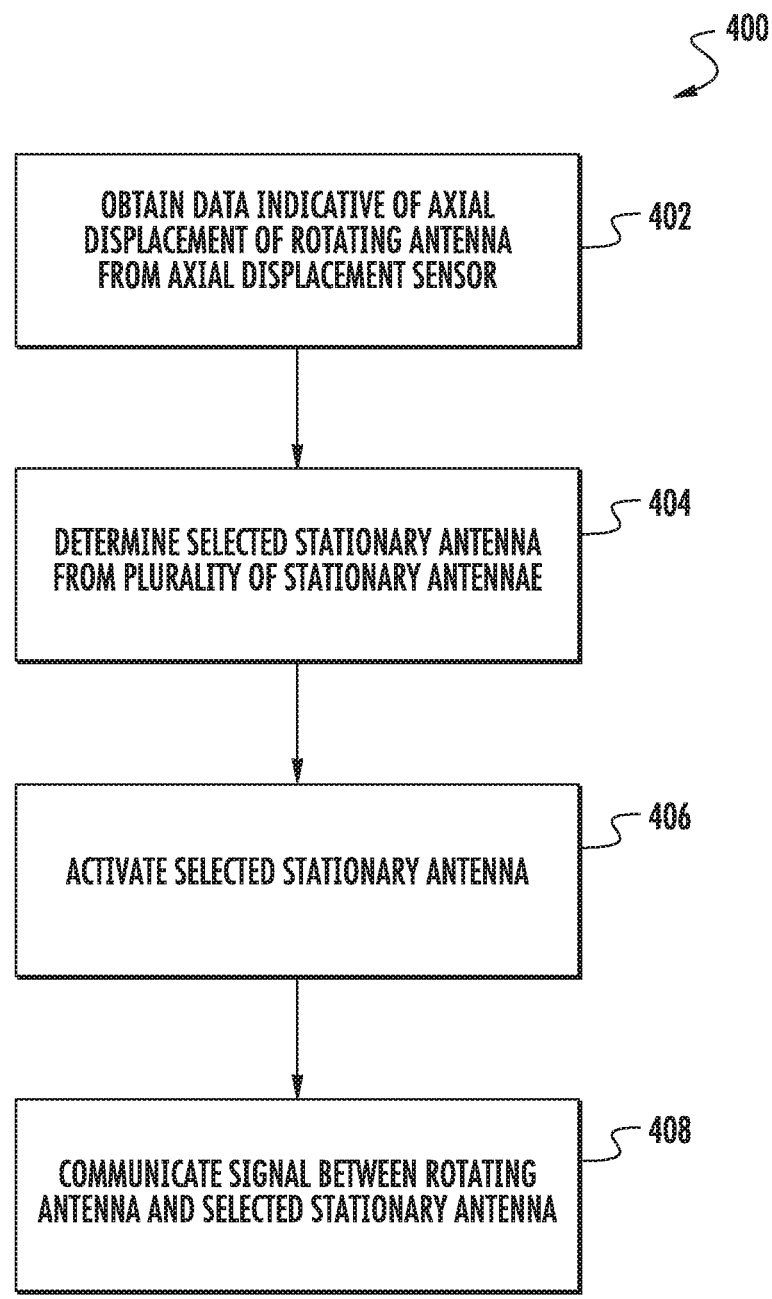
FIG. 4 depicts a flow diagram of an example method according to example embodiments of the present disclosure.

FIG. 4 depicts a flow diagram of an example method (400) according to example embodiments of the present disclosure. FIG. 4 can be implemented by one or more control devices, such as the control device 200 depicted in FIG. 3. In addition, FIG. 4 depicts steps performed in a particular order for purposes of illustration and discussion. Those of ordinary skill in the art, using the disclosures provided herein, will understand that the various steps of any of the methods disclosed herein can be modified, adapted, expanded, rearranged and/or omitted in various ways without deviating from the scope of the present disclosure.

At (402), the method can include obtaining measurements of an axial displacement of a rotating antenna. The axial displacement measurements can be obtained by, for example, one or more axial displacement sensors 308. The one or more axial displacement sensors 308 can be non-contact sensors, such as a displacement laser sensor or a capacitive probe. Alternatively, the measurements can be obtained from any other suitable axial displacement sensor. The one or more axial displacement sensors 308 can be configured to measure an axial displacement of the rotating antenna 304, for instance, such as a rotating antenna 304 mounted at a fixed location on a rotating shaft 302, as shown in FIG. 3.

At (404), the method can include determining a selected stationary antenna from an array of stationary antennae. For example, a stationary antenna from an array of stationary antenna 306 can be selected based on the proximity of a stationary antenna to a rotating antenna. For example, as depicted in FIG. 2, stationary antenna 306C can be selected from the array of stationary antennae 306 based on the proximity of stationary antenna 306C to rotating antenna 304. In one embodiment, a stationary antenna from the array of stationary antennae 306 in closest proximity to the rotating antennae 304 can be selected. In another embodiment, a stationary antenna from the array of stationary antennae 306 in sufficiently close proximity to a rotating antenna 304 to communicate a signal can be selected.

At (406), the method can include activating a selected stationary antenna. For example, a switch 316 can activate a selected antenna, such as stationary antenna 306C as depicted in FIG. 2. Activating a selected stationary antenna can comprise turning a stationary antenna on such that it is capable of communicating a signal with a rotating antenna. Activating a selected stationary antenna can also comprise switching from a first stationary antenna to a second stationary antenna.

At (408), the method can include communicating a signal between a rotating antenna and a selected stationary antenna. For example, a signal can be communicated between a rotating antenna 304 and a selected stationary antenna, such as stationary antenna 306C as depicted in FIG. 2. In one embodiment, communicating a signal can comprise sending a signal from a stationary antenna in an array of stationary antennae 306 to a rotating antenna 304. In another embodiment, communicating a signal can comprise sending a signal from a rotating antenna 304 to a stationary antenna in an array of stationary antennae 306.

Referring still to FIG. 4, the method (400) according to example aspects of the present disclosure can be performed in a periodic manner. For example, the method (400) can be repeated at set intervals such that an uninterrupted communication link can be established between a rotating antenna 304 and an array of stationary antennae 306.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for communicating a signal between a rotating antenna located on a shaft of a gas turbine and a plurality of stationary antennae, the method comprising:
obtaining, by one or more control devices, data indicative of an axial displacement of the rotating antenna located on the shaft of the gas turbine from one or more axial displacement sensors spaced along an axial direction, wherein the shaft defines the axial direction, and the plurality of stationary antennae spaced along the axial direction;
determining, by the one or more control devices, a selected stationary antenna from the plurality of stationary antennae based at least in part on the data indicative of the axial displacement of the rotating antenna;
activating, by the one or more control devices, the selected stationary antenna to communicate with the rotating antenna, and
communicating a signal between the rotating antenna and the selected stationary antenna.

2. The method of claim 1, wherein the one or more axial displacement sensors comprise one or more displacement laser sensors.

3. The method of claim 1, wherein the one or more axial displacement sensors comprise one or more capacitive probes.

4. The method of claim 1, wherein the rotating antennae comprises an antenna located on a rotating shaft of the gas turbine.

5. The method of claim 4, wherein the axial displacement of the rotating antenna is due to thermal expansion of the rotating shaft.

6. The method of claim 1, wherein the signal communicated between the selected antenna and the rotating antenna comprises a signal associated with a thermocouple or strain gauge.

7. The method of claim 1, wherein the selected stationary antenna of the plurality of stationary antennae is closest in proximity to the rotating antenna.

8. The method of claim 1, wherein communicating a signal between the rotating antenna and the selected stationary antenna comprises sending a signal from the rotating antenna to the selected stationary antenna.

9. The method of claim 1, wherein communicating a signal between the rotating antenna and the selected stationary antenna comprises sending a signal from the selected stationary antenna to the rotating antenna.

10. The method of claim 1, wherein said activating the selected stationary antenna comprises switching from another stationary antenna in the plurality of stationary antenna to the selected stationary antenna for communication with the rotating antenna.

11. A system comprising:

a rotating antenna located on a rotating shaft, the rotating shaft defining an axial direction;
a plurality of stationary antennae spaced in the axial direction relative to the rotating antenna; and
a control system configured to perform operations, the operations comprising:
obtaining data indicative of an axial displacement of the rotating antenna from one or more axial displacement sensors;
determining a selected stationary antenna from the plurality of stationary antennae based at least in part on the data indicative of the axial displacement of the rotating antenna;
activating the selected stationary antenna to communicate with the rotating antenna; and
communicating a signal between the rotating antenna and the selected stationary antenna.

12. The system of claim 11, wherein the one or more axial displacement sensors comprise one or more displacement laser sensors.

13. The system of claim 11, wherein the one or more axial displacement sensors comprise one or more capacitive probes.

14. The system of claim 11, wherein the axial displacement of the rotating antenna is due to thermal expansion of the rotating shaft.

15. The system of claim 11, wherein the selected stationary antenna of the plurality of stationary antennae is closest in proximity to the rotating antenna.

16. A gas turbine comprising:
a compressor section, a combustion section, and a turbine section in series flow;
a rotating shaft, the rotating shaft defining an axial direction;
one or more axial displacement sensors;
a rotating antenna located on the rotating shaft of the gas turbine;
a plurality of stationary antennae spaced in the axial direction relative to the rotating antenna; and
a control system configured to perform operations, the operations comprising:
obtaining data indicative of an axial displacement of the rotating antenna from the one or more axial displacement sensors;
determining a selected stationary antenna from the plurality of stationary antennae based at least in part on the data indicative of the axial displacement of the rotating antenna;
activating the selected stationary antenna to communicate with the rotating antenna; and
communicating a signal between the rotating antenna and the selected stationary antenna.

17. The gas turbine of claim 16, wherein the one or more axial displacement sensors comprise one or more displacement laser sensors.

18. The gas turbine of claim 16, wherein the one or more axial displacement sensors comprise one or more capacitive probes.

19. The gas turbine of claim 16, wherein the rotating antenna is configured to be axially displaced due to thermal expansion of the rotating shaft.

20. The gas turbine of claim 16, wherein the selected stationary antenna of the plurality of stationary antennae is closest in proximity to the rotating antenna.

* * * * *